Patented July 6, 1926.

1,591,795

UNITED STATES PATENT OFFICE.

WELLINGTON LEE TANNER, OF CLEVELAND, OHIO, ASSIGNOR TO THE GRASSELLI CHEMICAL COMPANY, OF CLEVELAND, OHIO, A CORPORATION OF OHIO.

PROCESS OF MAKING ARSENATES OF MANGANESE. REISSUED

No Drawing. Application filed July 30, 1923, Serial No. 654,781. Renewed November 12, 1925.

This invention relates to a process of making arsenates of manganese, and more particularly to the provision of an economical process involving the use of the relatively plentiful and inexpensive sources of manganese and arsenic, manganese dioxid and arsenious oxid.

Arsenates of manganese can be made by reacting upon manganese carbonate with arsenic acid and also as I have found by reacting upon manganese monoxid with arsenic oxid or acid. I have now found that arsenates of manganese may be made from arsenious oxid by treating the same with a nonoxidizing compound of manganese, such as the monoxid or carbonate in the presence of an oxidizing agent such as nitric acid, or by treating the arsenious oxid with an oxidizing compound of manganese such as manganese nitrate or the higher oxids of manganese such as $Mn_2O_3$, $Mn_3O_4$ and $MnO_2$ or mixtures thereof, the success of the last mentioned reactions presumably depending wholly, or at least in part, upon the mutual and simultaneous oxidation of the arsenious oxid to the arsenic oxid or its theoretical equivalent and the reduction of the manganese to the divalent atom. From the standpoint of economical commercial manufacture of arsenates of manganese the use of manganese dioxid and arsenious oxid of course is preferred, since these two compounds offer the cheapest and most plentiful sources of manganese and arsenic for that purpose at the present time, and the invention will be described and illustrated hereinafter by reference to the process of making arsenates of manganese from manganese dioxid and arsenious oxid, although it is to be understood that the invention embraces the other novel combinations of reagents heretofore referred to.

When manganese dioxid and arsenious oxid are heated together in the presence of moisture chemical combination takes place, but the reaction is either too slow or too incomplete to suffice for the commercial use. In experimental work directed to the finding of reaction conditions whereby the combination of manganese dioxid with arsenious oxid could be hastened and brought to completion or substantial completion in a commercially practicable manner, the effect of a variety of catalytic or accelerating agents was tried with varying success. The results of these experiments clearly indicated that as catalytic or accelerating agents may be used, in general, substances capable of forming an easily dissociable or labile compound with manganese. Among substances of this general class may be mentioned nitric acid, nitrobenzene, picric acid, acetic acid, formic aid, hydrofluosilicic acid, sulfonic acid products of hydrocarbons, and metal nitrates, such as manganese nitrate and the alkali and alkaline earth metal nitrates. As is indicated therefore the use of a catalytic agent for the reaction is preferred, although, as stated, manganese dioxid and arsenious oxid react in the absence of a catalytic agent and the carrying out of the reaction in the absence of a catalytic agent, therefore, is embraced by the invention.

Further characteristics of the invention will be pointed out hereinafter.

The following is a description of a preferred procedure in accordance with my invention, which will serve to illustrate it.

261 parts by weight of manganese dioxid or an equivalent quantity of a manganese dioxid containing material, such as a manganese dioxid ore, or concentrate, is mixed with 198 parts by weight or arsenious oxid (white arsenic) or an equivalent quantity of an arsenious oxid containing material, 160 parts by weight of water, and 12 parts by weight of nitric acid, and the mixture is heated to a temperature of say 80 to 100° C. in, for instance, a hot water or steam jacketed vessel and stirred or agitated, water being added from time to time, if necessary, to maintain the mixture in a moist and pasty condition.

The proportions of manganese dioxid and arsenious oxid given are the theoretical combining proportions, the quantity of water is the quantity found to give the best results, both with respect to reaction rate and the workability of the mixture, the quantity of nitric acid is the best from the standpoint of economy in the use of nitric acid and reaction rate, and the temperature is highest temperature usable without undue evaporation of the liquid content of the mixture. Under the conditions stated, substantially complete reaction will take place in about three hours.

It will be understood that the reaction may be carried out with proportions of the manganese dioxid and arsenious oxid other than those given in the foregoing example. The quantity of water used in the reaction mixture may be varied, but in this connection it is noted that the reaction is much slower or does not take place at all if the mixture is too dry, and if too much water is used, for instance, a quantity sufficient to make a thin slurry, the reaction rate is retarded. The quantity of nitric acid in the reaction mixture may also be varied. If, for instance, the quantity of nitric acid in the reaction mixture is reduced by one half, the reaction rate is greatly reduced, while the use of more nitric acid does not give a corresponding increase in the reaction rate. In general the higher the temperature to which the reaction mixture is heated, the greater is the reaction rate and the carrying out of the process under superatmospheric pressure in order to make possible the employment of higher temperatures therefore is contemplated.

Oxids of manganese other than $MnO_2$, to wit, $Mn_2O_3$ and $Mn_3O_4$ or mixtures thereof may replace wholly, or in part, the manganese dioxid in the foregoing example.

As has already been stated, a variety of catalytic or accelerating agents may be used, for instance in the example, the twelve parts by weight of nitric acid may be replaced by an equal weight of nitrobenzene, the results being substantially the same as with the nitric acid. When for instance acetic acid or formic acid is substituted for the nitric acid in the example, the reaction is accelerated, but the results are not so good, the reaction rate being considerably slower than when the nitric acid is used.

The product may be marketed directly in the pasty condition in which it is produced, or it may be ground and then dried, or the paste may be dried and then ground, as preferred. The product in view of its arsenic content suggests itself as being a valuable material for use as or in insecticides.

In the appended claims I have defined the interaction of arsenious acid with a manganese compound capable of oxidizing arsenious acid under which of course are included manganese nitrate and the higher oxids of manganese.

It is also to be understood that the claims cover not only the use of such oxidizing compounds of manganese as starting materials, but also the use as starting materials of reagents capable of forming or having the same effect as the oxidizing compounds of manganese such as for instance, the use of a non-oxidizing compound of manganese in conjunction with an oxidizing agent.

I claim:—

1. Process of making manganese arsenates which comprises heating to reacting temperature a mixture of a compound of manganese capable of oxidizing arsenious oxid with arsenious oxid in the presence of water.

2. Process of making manganese arsenates which comprises heating to reacting temperature a mixture of a higher oxid of manganese than the monoxid with arsenious oxid in the presence of water.

3. Process of making manganese arsenates which comprises heating to reacting temperature a mixture of a higher oxid of manganese than the monoxid with arsenious oxid in the presence of water and a catalytic agent.

4. Process of making manganese arsenates which comprises heating to reacting temperature a mixture of a higher oxid of manganese than the monoxid with arsenious oxid in the presence of water and a substance capable of forming with manganese an easily dissociable product.

5. Process of making manganese arsenates which comprises heating to reacting temperature a mixture of a higher oxid of manganese than the monoxid with arsenious oxid in the presence of water and nitric acid.

6. Process of making manganese arsenates which comprises heating to reacting temperature a mixture containing a higher oxid of manganese than the monoxid with arsenious oxid and water in quantity sufficient to form a pasty mass and a catalytic agent.

7. Process as defined in claim 6 in which the catalytic agent employed is nitric acid.

8. Process as defined in claim 6 in which the oxid of manganese employed is manganese dioxid.

9. Process of making an arsenate of manganese which comprises heating to reacting temperature a mixture comprising about 261 parts by weight of manganese dioxid, 198 parts by weight of arsenious oxid, 160 parts by weight of water and 12 parts by weight of nitric acid, agitating the mixture during the heating operation and adding water as required to maintain the consistency thereof.

10. Process of making manganese arsenates which comprises heating to reacting temperature a mixture of an oxy compound of manganese and arsenious oxid in the presence of an oxidizing agent capable of oxidizing arsenious arsenic to arsenic arsenic and water.

In testimony whereof, I affix my signature.

WELLINGTON LEE TANNER.